United States Patent [19]
Sheehan

[11] Patent Number: 5,866,853
[45] Date of Patent: Feb. 2, 1999

[54] LIQUID-TIGHT, STRAIN-RELIEF CONNECTOR FOR CONNECTING CONDUIT AND THE LIKE

[76] Inventor: Robert K. Sheehan, 571 Rolling Rock La., Cincinnatti, Ohio 45255

[21] Appl. No.: 133,509

[22] Filed: Oct. 7, 1993

[51] Int. Cl.$^6$ ................................................ H02G 3/18
[52] U.S. Cl. .................... 174/65 SS; 174/17.06; 174/153 R; 285/162
[58] Field of Search .................. 174/65 R, 65 G, 174/65 SS, 151, 17.06, 153 R; 285/162

[56] References Cited

U.S. PATENT DOCUMENTS

| | | | |
|---|---|---|---|
| 2,858,358 | 10/1958 | Hawke | 174/89 |
| 3,285,551 | 11/1966 | Tschanz | 248/56 |
| 3,352,961 | 11/1967 | Simon | 174/65 R |
| 3,493,205 | 2/1970 | Bromberg | 248/56 |
| 3,667,783 | 6/1972 | Sotolongo | 285/161 |
| 3,788,582 | 1/1974 | Swanquist | 248/56 |
| 4,056,252 | 11/1977 | Simon | 248/56 |
| 4,116,472 | 9/1978 | Schmitt | 285/4 |
| 4,157,799 | 6/1979 | Simon | 248/56 |
| 4,234,218 | 11/1980 | Rogers | 285/162 |
| 4,250,348 | 2/1981 | Kitagawa | 174/65 SS |
| 4,358,079 | 11/1982 | Navarro | 248/56 |
| 4,387,267 | 6/1983 | Becker | 174/65 SS |
| 4,513,172 | 4/1985 | Matsui | 174/65 SS |
| 4,738,636 | 4/1988 | Bolante | 439/462 |
| 4,787,657 | 11/1988 | Henniger | 285/323 |
| 4,814,547 | 3/1989 | Riley et al. | 174/65 SS |
| 4,891,470 | 1/1990 | Studenski | 174/65 SS |
| 5,068,496 | 11/1991 | Favalora | 174/65 R |
| 5,132,493 | 7/1992 | Sheehan | 174/65 R |

*Primary Examiner*—Kristine Kincaid
*Assistant Examiner*—Paramita Ghosh
*Attorney, Agent, or Firm*—Dinsmore & Shohl LLP

[57] ABSTRACT

There is provided a strain-relief, liquid tight for connecting conduit or the like to a bulkhead such as an electrical box, with the connector having a body having front and rear portions, and a substantially hollow inner throughbore formed along a longitudinal axis thereof. The front portion of the connector body is adapted for attachment to a bulkhead. A flexible seal member is mounted at least partially within the hollow inner throughbore for receiving a conduit inserted therethrough, this seal member facilitating a substantially liquid tight seal about an inserted conduit during use. An at least partially hollow grip for selectively gripping the conduit is included, and a clamp nut is telescoped over the rear portion of the body for selective longitudinal adjustment therealong. The longitudinal adjustment of this clamp nut provides inward radial compression of the flexible grip about the conduit. In a preferred embodiment of the present invention, the grip member comprises a plurality of gripping fingers cantilevered from a ring-like base portion, and the seal member is at least partially disposed within the grip member. A cam surface is provided in the interior of the body, and a compression member on the clamp nut urges the gripping fingers against this cam surface thereby causing the fingers to be compressed radially inward. This results in the conduit being gripped and also enhances the sealing of the seal member about the conduit.

20 Claims, 4 Drawing Sheets

LIQUID-TIGHT, STRAIN-RELIEF CONNECTOR FOR CONNECTING CONDUIT AND THE LIKE

TECHNICAL FIELD

This invention relates to a liquid-tight, strain-relief connector for connecting conduit, cable, wire and the like to a bulkhead such as an electrical box, and, more particularly, to an improved connector having a seal member for facilitating a liquid-tight seal about the conduit, and a grip for securing the conduit within the connector to provide strain relief.

BACKGROUND ART

Numerous devices have been utilized to connect conduit, cable, wire and the like to electrical boxes and similar bulkheads. For example, U.S. Pat. No. 4,891,470, (issued to Studenski) depicts a screw-type cable fitting wherein the securing of a cap nut (11) to the device forces the free ends of clamping lamellae inwardly to hold the cable within the fitting. Additionally, a packing ring may be provided wherein said ring is radially compressed against the sheath of the cable to provide a seal. Another screw-type coupling is shown by U.S. Pat. No. 4,787,657 (issued to Heniger), wherein the threading of a cap nut onto the coupling causes a plurality of prongs to collapse a sealing element. Likewise, U.S. Pat. No. 4,358,079 (issued to Navarro) and U.S. Pat. No. 4,250,348 (issued to Kitagawa) show similar arrangements for cable fittings.

None of these references, however, provide a liquid-tight and strain relieving connector having not only an improved liquid-tight seal and superior gripping of the conduit or cable being connected, but also a means for sealingly attaching the connector to a bulkhead.

SUMMARY OF THE INVENTION

It is an object of the present invention to provide a liquid-tight connector for conduit, cable, wire, rope and the like.

It is another object of the present invention to provide a liquid-tight for connecting conduit and the like to an electrical box or similar bulkhead.

It is yet another object of the present invention to provide a liquid-tight connector that also acts to relieve strain on the conduit being connected.

It is another object of the present invention to provide, in one embodiment, as easily manufactured strain-relief, liquid-tight connector having an internal seal end grip member wherein said grip acts to not only relieve strain on the conduit but also enhances the sealing capabilities of the seal member.

In accordance with one aspect of the present invention, there is provided a strain-relief, liquid-tight connector for connecting conduit or the like to a bulkhead such as an electrical box, with the connector having a body having front and rear portions, and a substantially hollow inner throughbore formed along a longitudinal axis thereof. Means for attaching the front portion of the connector body to a bulkhead is also provided. A flexible seal member is mounted at least partially within the hollow inner throughbore for receiving a conduit inserted therethrough, this seal member facilitating a substantially liquid-tight seal about an inserted conduit during use. An at least partially hollow grip for selectively gripping the conduit is included, and a clamp nut is telescoped over the rear portion of the body for selective longitudinal adjustment therealong. The longitudinal adjustment of this clamp nut provides inward radial compression of the flexible grip about the conduit.

In a preferred embodiment of the present invention, the grip member comprises a plurality of gripping fingers cantilevered from a ring-like base portion, and the seal member is at least partially disposed within the grip member. A cam surface is provided in the interior of the body, and a compression member on the clamp nut urges the gripping fingers against this cam surface thereby causing the fingers to be compressed radially inward. This results in the conduit being gripped and also enhances the sealing of the seal member about the conduit.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
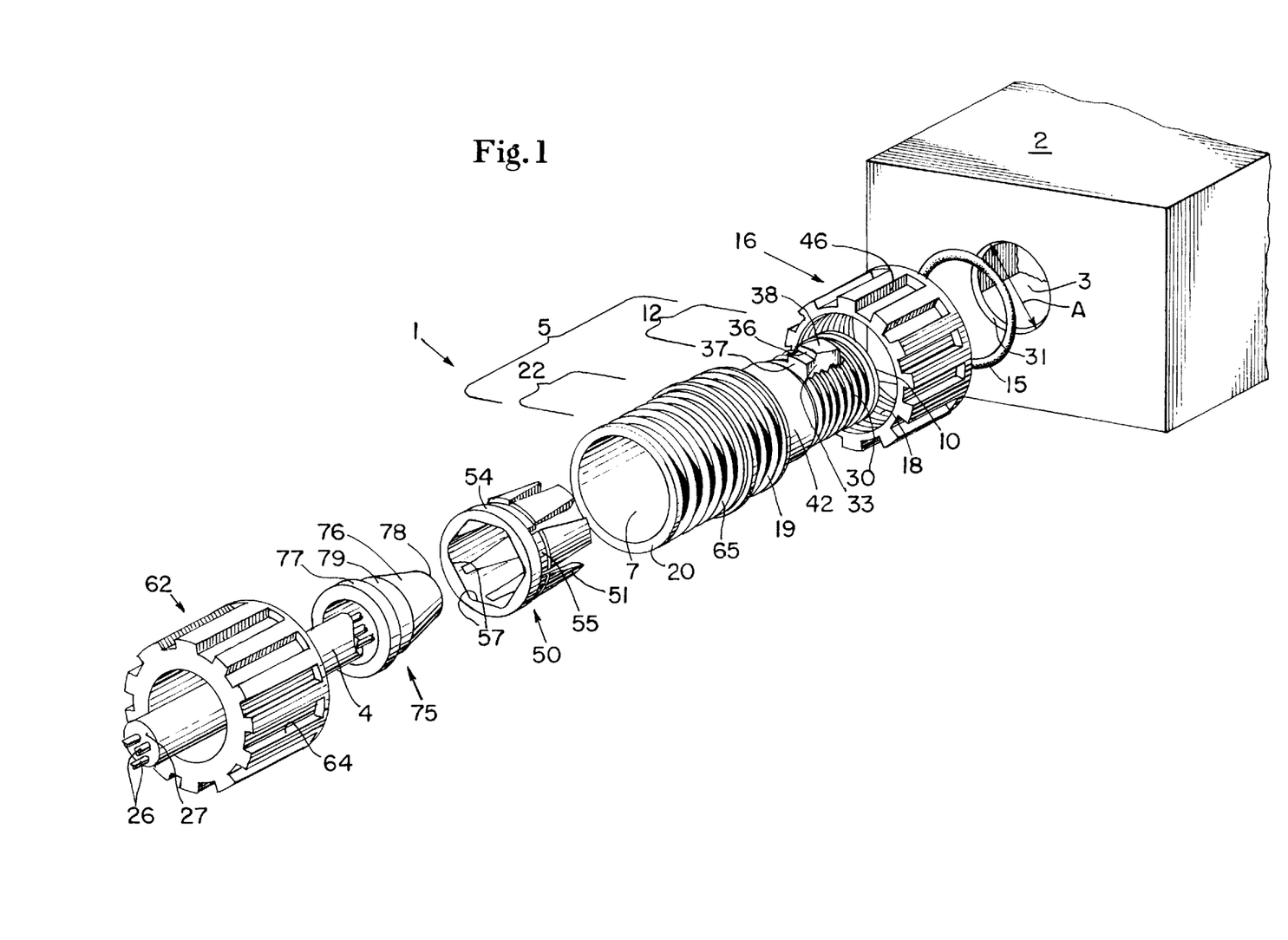
FIG. 1 is an exploded, perspective view of a preferred embodiment of the connector of the present invention.

Referring now to the drawings in detail, wherein like numerals indicate the same elements throughout the views, FIG. 1 illustrates an exploded, perspective view of a preferred embodiment of a connector 1 made in accordance with the present invention. As shown in FIG. 1, connector 1 comprises a body 5 having a front end 10 and a rear end 20. Body 5 is also substantially hollow, having an inner throughbore 7 formed along a longitudinal axis. Inner throughbore 7 provides a passageway between front end 10 and rear end 20 through which conduit 4 may pass.

It should be noted from the outset that the term "conduit" is intended to encompass not only the common meaning of the term, but also cable, wire, rope, pipe, and other similar structures, as the connector of the present invention may be utilized in a variety of applications. Conduit 4 of FIG. 1, often referred to as electrical cable, comprises a plurality of wires 26, surrounded by a cylindrical industry, and is typically attached to an electrical box by means of a connector. The liquid-tight, strain-relief connector of the present invention, however can be used for any of the types of conduit defined and described above.

While the connector of the present invention can be used for providing a liquid-tight connection of numerous types of structures, waterproof electrical box 2 is shown in FIG. 1. Electrical box 2 has an aperture 3 into which connector 1 is to be inserted, thereby connecting conduit 4 to the interior of electrical box 2. The connector of the present invention, however, can be used with any bulkhead having an aperture designed to accept the connector of the present invention in the manner described herein.

Positioned on front portion 12 of connector body 5 is a means for sealingly attaching body 5 to a bulkhead such as electrical box 2. In the presently preferred embodiment of FIG. 1, external threads 30 are provided on front portion 12 of body 5, adjacent front end 10. External threads 30 may extend any desired length along body 5, depending upon the degree to which one wishes to insert body 5 into aperture 3. If desired, external threads 30 may correspond to threads about the inner circumference 31 of aperture 3. In this fashion, body 5 may be threadably secured to aperture 3. More preferably, however, aperture 3 has a substantially smooth, circular inner circumference 31. In this fashion, front end 10 of body 5 may be inserted into aperture 3, and a nut or similar securing device threaded onto external threads 30 within electrical box 2. In this fashion, body 5 will be secured to electrical box 2.

Figure 2:
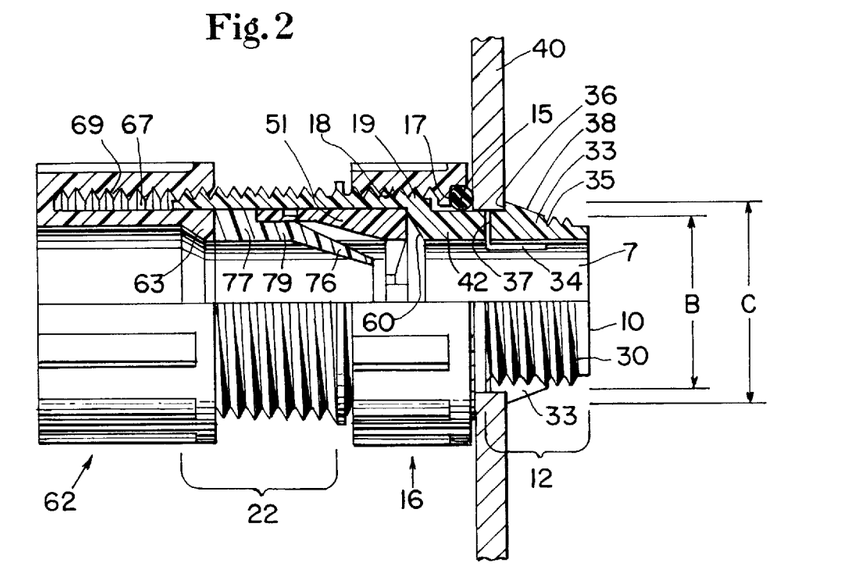
FIG. 2 is a partially cut-away view of the connector of FIG. 1, wherein the connector has been attached to an electrical box.

In addition to external threads 30, as shown in FIGS. 1 and 2, at least one, and preferably at least two, resiliently compressible locking tabs 33 are also provided on front portion 12 of body 5, adjacent front end 10. Openings 34 are provided on body 5, and tabs 33 are positioned within openings 34. In addition, tabs 33 are cantilevered from body 5 at edges 35 of tabs 33. In this fashion, tabs 33 may be resiliently compressed into openings 34, with the tabs flexing from edges 35. As also shown by FIG. 1, each tab 33 further comprises a shoulder 36 at rearward edge 37 of tab 33. It is also preferable that top surface 38 of tab 33 slope outwardly from edge 35 towards shoulder 36. As will be understood, this sloping of top surface 38 facilitates the insertion of front portion 12 into aperture 3.

In order to utilize tabs 33 for connecting body 5 to bulkhead 2, it is necessary that diameter A of aperture 3 be, at a minimum, substantially equivalent to the diameter B of front portion 12 at front edges 35 of tabs 33 when the tabs are in their uncompressed state. Diameter A, however, must not be greater than diameter C of front portion 12 at shoulders 36 of tabs 33, when the tabs are in their uncompressed state (as shown in FIG. 2). In this fashion, as front end portion 12 is inserted into aperture 3, tabs 33 will be resiliently compressed until shoulders 36 have been inserted into aperture 3 past the interior side of wall 40 of electrical box 2. At this point, tabs 33 will at least partially return to their uncompressed state. It is preferred that, in order to rigidly secure body 5 to aperture 3, that diameter A of aperture 3 be sized such that tabs 33 cannot completely return to their uncompressed state. In this fashion, tabs 33 will provide an outward force against inner circumference 31 of aperture 3.

As also shown by FIGS. 1 and 2, both external threads 30 and tabs 33 may be provided on front portion 12. In this fashion, connector 1 can be utilized with a number of different aperture types, thereby increasing the versatility of connector 1. If external threads 30 are being utilized for connecting front portion 12 to an aperture, tabs 33 will become compressed as threads 30 are engaged with corresponding threads on either the inner circumference of aperture 3 or a nut that is threaded onto external threads 30. Likewise, the presence of external threads 30 will not interfere with the functioning of tabs 33 in the manner described previously.

Since one of the features of the preferred embodiment of the present invention is the provision of a liquid-tight connection to the bulkhead, it is also preferable that a sealing means be provided for sealing about aperture 3. Although an internal sealing means will be described later, it is also desirable to provide a means for preventing water, other liquids, and even gaseous materials, from entering into a structure such as electrical box 2 through aperture 3. Electrical box 2 shown in FIG. 1 is of the waterproof variety, and thus it is necessary to ensure that water cannot enter through aperture 3. While the interior sealing means to be described later will prevent water and the like from entering electrical box 2 through inner throughbore 7, it will often be necessary to provide an additional sealing means on the outside of body 5, particularly when tabs 33 are utilized for attaching connector 1 to electrical box 2. Thus, an elastomeric member is provided.

As shown in FIGS. 1 and 2, in the preferred embodiment the elastomeric member is an O-ring 15. O-ring 15 is disposed about intermediate body portion 42, and is preferably sized to fit somewhat smugly about body portion 42. Sealing nut 16 is also provided, and is disposed about body 5 between front end 10 and rear end 20. Sealing nut 16 is furthermore positioned immediately adjacent O-ring 15, so that longitudinal adjustment of sealing nut 16 towards front end 10 will cause O-ring 15 to be compressed between sealing nut 16 and wall 40 completely about aperture 3. The compression of O-ring 15 in this position will form a seal about aperture 3 thereby preventing liquids or other matter from entering electrical box 2 through aperture 3, and also rigidifies the attachment of connector 1 to the bulkhead. To further enhance the seal, as shown in FIG. 2, a recess 17 is provided about the inner circumference of sealing nut 16 on the side adjacent O-ring 15. Recess 17 is sized to accept O-ring 15, and prevents O-ring 15 from being displaced radially outward when it is compressed between sealing nut 16 and wall 40. In this fashion, recess 17 acts to enhance the sealing capabilities of O-ring 15.

Sealing nut 16 is substantially tubular in nature and longitudinal adjustment of sealing nut 16 on body 5 is accomplished by providing internal threads 18 corresponding to second external threads 19 on body 5 immediately adjacent and behind intermediate body portion 42. The exterior surface of sealing nut 16 is also preferably formed with a plurality of ribs or knurling 46 to facilitate rotation of sealing nut 16 as required. It is also preferable that second external threads 19 run counter directional to external threads 30, so that sealing nut 16 may be tightend against wall 40 without interfering with the connection of front end 10 to aperture 3 when external threads 30 are being utilized for this connection. In other words, it is preferred that external threads 30 be of the right-hand variety, while second external threads 19 are of the left-hand variety, or vice versa.

As mentioned previously, the connector of the present invention also acts as a strain relief on the conduit being attached. The connector of the present invention, as described previously, is rigidly connected to a bulkhead such as an electrical box. In order to provide strain relief on the conduit, therefore, gripping means is also provided whereby the conduit is rigidly secured within the connector body. In this fashion, strain on the conduit is relieved. This in turn, can result in advantageous results, for example, when the connector of the present invention is being used to attach electrical cable to an electrical box. By relieving the strain on the electrical cable, the cable can be secured to other elements within the electrical box without risk of becoming disengaged therefrom.

Figure 3:
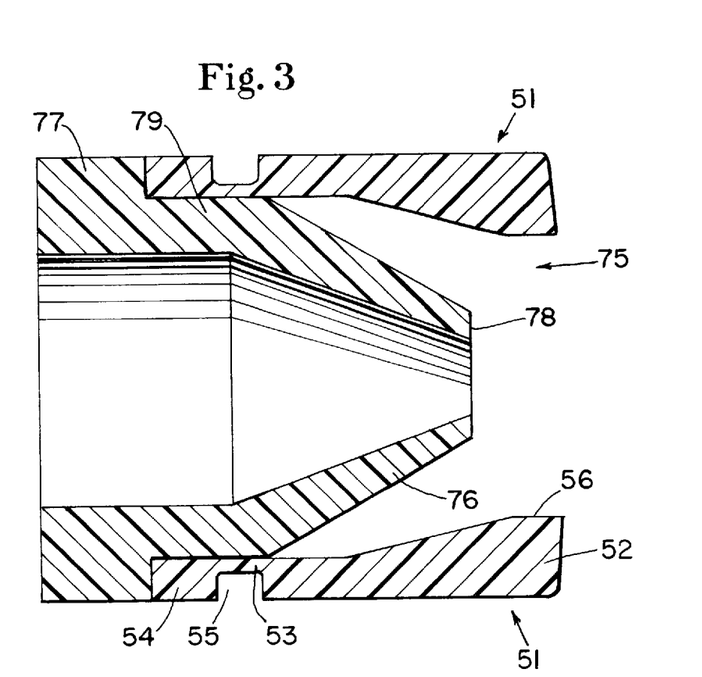
FIG. 3 is an enlarged, cross-sectional view of the grip member and seal member of the embodiment of FIG. 1.
Figure 4:
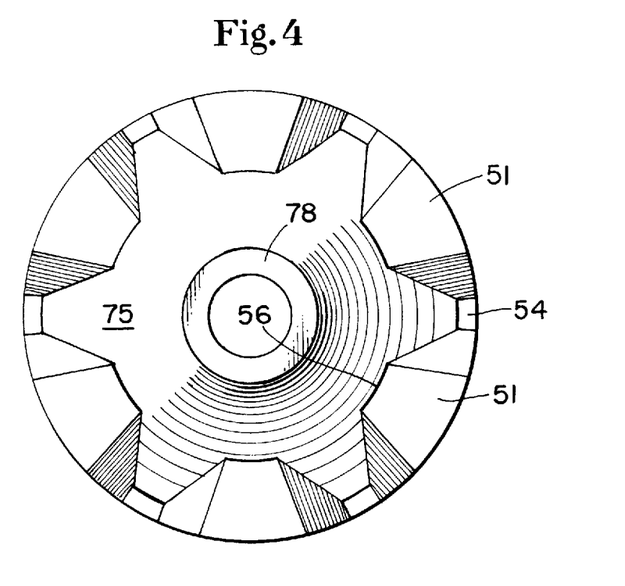
FIG. 4 is a right-end view of the elements shown in FIG. 3.

As shown in FIGS. 1 and 2, strain-relief in the preferred embodiment is enhanced by the provision of conduit grip member 50 which secures conduit 4 within throughbore 7 of the connector. In this embodiment, grip 50, as shown more precisely by FIGS. 3 and 4, is tubular in design, and comprises a plurality of substantially rigid gripping fingers 51. Each of gripping fingers 51 has a conduit-contacting end 52 and a flexing end 53. Gripping fingers 51 are longitudinally cantilevered from grip base 54, which permits gripping fingers 51 to collapse or "flex" radially inward. The thickness of each finger, as shown in FIG. 3, is preferably less at flexing end 53 than at conduit-contacting end 52, which results in gripping fingers which are rigid at contacting end 52, with enhanced flexibility at flexing end 53. The flexibility of fingers 51 is further enhanced by the provision of groove 55 about the flexing end 51 of each gripping finger. By placing groove 55 on the outer portion of each finger, the ability of the gripping fingers to collapse inwardly is enhanced, while the ability of the fingers to flex radially outward is not.

As shown in FIG. 1, each gripping finger 51 is wider at its flexing end 53 than at its contacting end 52, and the gripping fingers are preferably in a spaced-apart relationship. The wide flexing end ensures that the fingers will not break when flexed inwardly, while the narrow contacting end permits the gripping fingers to flex further inwardly without contacting interfering with one another. As will be better understood below, this latter feature enables the connector of the present invention to be employed with a number of different conduit sizes. Grip base 54 is preferably ring-like, thereby maintaining the tubular nature of conduit grip 50 and ensuring that a conduit may pass therethrough. In addition, a plurality of flat edges 57 are provided on the inner circumference of ring-like base 54, corresponding to each gripping finger. Flat edges 57 further help to facilitate the inward flexing of gripping fingers 51.

Grip base 54 is also sized to slideably fit within inner throughbore 7 of body 5, as shown in FIG. 2. Thus, when grip 50 is inserted into throughbore 7, conduit 4 may still pass through body 5 between gripping fingers 51 which are oriented along the longitudinal axis of body 5. As also shown in FIG. 2, a cam surface 60 is provided within body 5 intermediate front end 10 and rear end 20. When grip 50 is inserted into body 5, conduit-contacting ends 52 of gripping fingers 51 will rest against on adjacent cam surface 60. Thus, by applying a force against grip base 54 in the direction of front end 10, gripping fingers 51 will be inwardly compressed by cam surface 60. When a conduit 4 is present, contacting ends 52 of fingers 51 will be forced against conduit 4, thereby gripping the conduit. The gripping ability of fingers 51 is further enhanced by the provision of a flat, substantially non-sloped surface 56 on the interior of each finger 51 at conduit-contacting end 52.

In order to supply the requisite force against grip base 54 to thereby grip conduit 4, clamp nut 62 is telescoped over rear portion 22 of body 5. Clamp nut 62 further comprises compression member 63 (shown in FIG. 2) which is sized to slideably fit within throughbore 7 of body 5 at rear portion 22. As clamp nut 62 is longitudinally adjusted toward front end 10, compression member 63 will force grip base 54 towards cam surface 60, thereby causing gripping fingers 51 to be compressed radially inward by cam surface 60. As also shown in FIGS. 1 and 2, clamp nut 62 and compression member 63 are both tubular in nature, thereby permitting conduit 4 to pass therethrough.

Longitudinal adjustment of clamp nut 62 is accomplished by providing threads on clamp nut 62 corresponding to third external threads 65 on rear portion 22 of body 5. In the preferred embodiment of FIGS. 1 and 2, an annular space 67 is provided between the outer portion of compression member 63 and the interior surface of clamp nut 62. Internal threads 69, corresponding to third external threads 65, are provided on clamp nut 62, thereby permitting longitudinal adjustment of clamp nut 62 along the longitudinal axis of body 5 about rear portion 22. Third external threads 65 also preferably run counter directional to second external threads 19. In this fashion, sealing nut 16 may be grasped when clamp nut 62 is being rotated thereby enabling one to provide rotational force to sealing nut 16 at the same time, resulting in the tightening of both nuts. As will be apparent, the closer clamp nut 62 is positioned to front portion 12, the tighter conduit 4 will be gripped since gripping fingers 51 will be compressed to a greater degree. The exterior surface of clamp nut 62 is also preferably formed with a plurality of ribs of knurling 64 to facilitate rotation of clamp nut 62 as required.

As mentioned previously, the connector of the present invention is also liquid-tight, and therefore an internal sealing means is provided. As shown in FIGS. 1 and 2, flexible seal member 75 is also provided. Seal member 75 is also substantially tubular in nature, thereby permitting conduit 4 to pass therethrough, and is sized to telescopically fit within throughbore 7 of body 5. As shown in detail in FIGS. 3 and 4, seal 75 also has a collapsible sealing end 76 attached to a support collar 77, by means of circular seal base 79. Sealing end 76 preferably tapers inwardly away from seal base 79, thereby facilitating the inserting of a conduit into seal 75.

Since sealing end 76 is preferably tapered, distal end 78 of sealing end 76 will be the portion of sealing end 76 having the smallest diameter. It is preferred, therefore, that the diameter of distal end 78 be slightly smaller than the diameter of conduit 4. In order to improve the versatility of the connector of the present invention, various seals 75 having differently sized sealing ends 76 may be provided for use with the same connector. In addition, in the preferred embodiment, grip 50 will also enhance the sealing of sealing end 76 about conduit 4 in a manner to be described, thereby permitting the same sized seal 75 to work effectively with a number of differently sized conduits.

Support collar 77 is ring-like, thereby permitting conduit 4 to pass therethrough. Additionally, it is preferred that the outer diameter of collar 77 be greater than the inner diameter of ring-like base 54 of grip member 50. Sealing end 76 can then be telescopically received at least partially within grip member 50, and the preferred sizing of collar 77 ensures that only sealing end 76 and seal base 79 can extend into grip 50, and not collar 77. In this fashion, when gripping fingers 51 are collapsed about conduit 4, the inner surfaces of gripping fingers 51 will force sealing end 76 against conduit 4 thereby enhancing the liquid-tight seal. It should be noted that, as shown in FIG. 2, compression member 63 of clamp nut 62 will actually be forced against collar 77 when seal member 75 is utilized. Collar 77 will in turn urge ring-like grip base 54 towards cam surface 60, thereby causing gripping fingers 51 to be compressed radially inward, as described previously.

It is also preferred that when sealing end 76 is fully inserted into grip member 50, with further insertion limited by collar 77 as previously described, that sealing end 76 be sized so that distal end 78 does not extend beyond gripping fingers 51. In this fashion, flat surface 56 on each of gripping fingers 51 will still be in direct contact with conduit 4, thereby maintaining the desired tight, strain-relieving grip on the conduit.

It is preferred that body 5 of connector 1 be singularly molded of an inexpensive, relatively rigid, lightweight material such as rigid plastic. Of course other materials such as metals could be employed, and body 5 could also be made in more than one piece. Grip 50, sealing nut 16, and clamp nut 62 are also preferably each singularly molded of rigid plastic. Seal member 75, however, must be of an elastomeric material capable of forming a liquid-tight seal about conduit 4. Suitable materials would include various types of polymers known to those skilled in the art.

Figure 5:
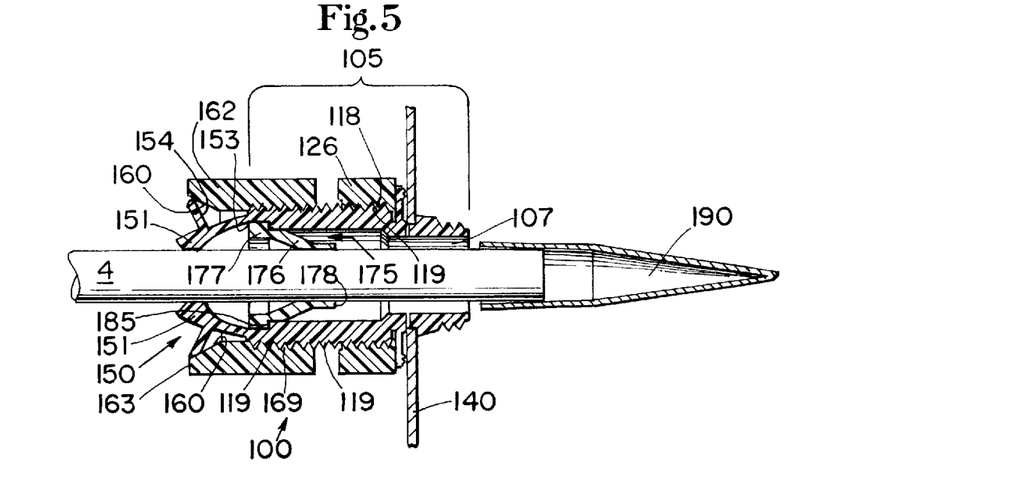
FIG. 5 is cross-sectional view of an alternative embodiment of the connector of the present invention, wherein the connector has been attached to an electrical box.
Figure 6:
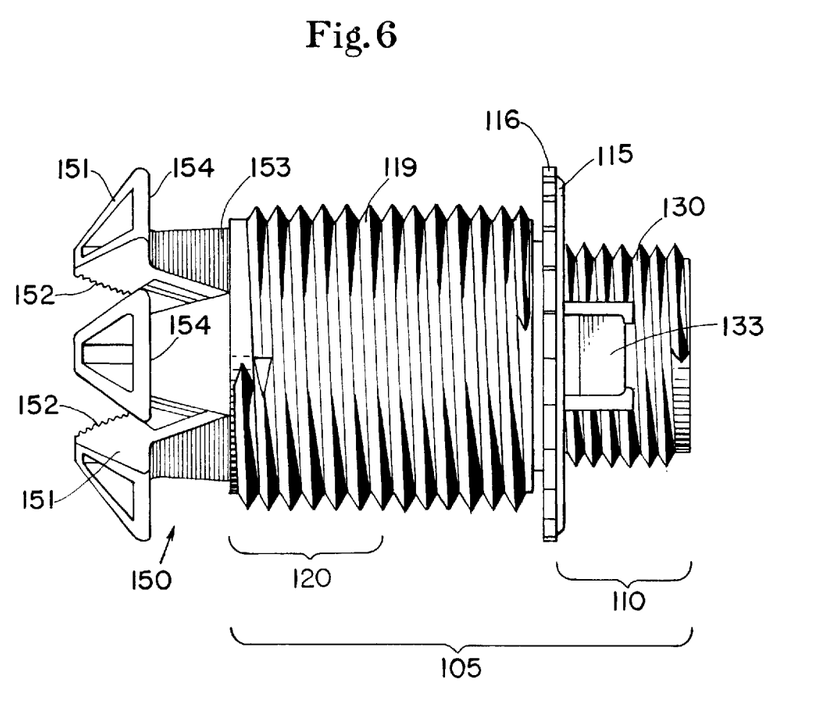
FIG. 6 is a side view of the body portion of the connector of FIG. 5.

FIGS. 5 and 6 depict an alternative embodiment for the liquid-tight, stress-relieving connector of the present invention. Connector 100 comprises a body portion 105, having a hollow inner throughbore 107 formed along a longitudinal axis. Body portion 105 also has a front portion 110 and a rear portion 120. A means for attaching connector body 105 to a bulkhead is provided on front portion 110, and is identical in construction to that described previously for the preferred embodiment. Specifically, external threads 130 are provided on front portion 110, as well as resiliently compressible locking tabs 133. The structures operate in the same manner as previously described, and will not be discussed further.

A sealing means is also once again provided for sealing about the aperture in the bulkhead to which the connector is attached. In the embodiment of FIGS. 5 and 6, this sealing means once again comprises an elastomeric member which is compressed between a sealing nut and the bulkhead. Specifically, the elastomeric member in this embodiment comprises circular seal 115 which is carried by disk-like extension 116 which extends radially outward from body 105 adjacent front portion 110. Disk-like extension 116 is flexibly attached to body 105 so that extension 116 can be urged towards front portion 110. When extension 116 is urged towards front portion 110, as shown in FIG. 5, circular seal 115 will be compressed against electrical box wall 140 about the aperture into which the connector has been inserted, thereby providing the desired seal.

In order to urge extension 116 towards front portion 110, a longitudinally adjustable sealing nut 126 is provided. Sealing nut 126 is substantially tubular in nature and longitudinal adjustment of sealing nut 126 on body 105 is accomplished by providing internal threads 118 corresponding to second external threads 119 on body 105 immediately adjacent and behind flexible extension 116. In this fashion, when front portion 110 has been inserted into an aperture, one merely tightens sealing and 126 to compress circular seal 115 between sealing nut 126 and electrical box wall 140, thereby forming the desired seal as well as further securing the connector in the bulkhead.

In order to provide the desired strain relief, hollow grip member 150 is once again provided. Grip member 150 comprises a plurality of substantially rigid gripping fingers 151, each gripping finger 151 having a ribbed conduit-contacting end 152, a flexing end 153, and a shoulder 154. In this embodiment, however, grip member 150 is positioned substantially outside of body portion 105, and each gripping finger 151 is cantilevered from rear portion 120 of body 105 at flexing end 153 of each gripping finger. In this fashion, each gripping finger 151 can be compressed radially inward in order to thereby grip conduit 4 passing through body 105, as shown in FIG. 5.

Collapsing of gripping fingers 151 about the conduit is accomplished by providing a clamp nut 162 telescoped over rear end 120 of body 105. Clamp nut 162 is tubular in nature and is longitudinally adjustable along rear portion 120. Clamp nut 162 also has a cam surface 160 disposed about the inner circumference of distal end 163 of clamp nut 162. When clamp nut 162 is longitudinally adjusted away from front portion 110, cam surface 160 will contact each shoulder surface 154 of gripping fingers 151, thereby radially compressing the gripping fingers to contact, and thereby grip the conduit.

Longitudinal adjustment of clamp nut 162 on body 105 is accomplished by providing internal threads 169 corresponding to second external threads 119 on body 105. As shown in FIGS. 5 and 6, second external threads 119 extend rearwardly from extension 116 through rear portion 120 of body 105. Thus, sealing nut 126 and clamp nut 162 are both threaded onto second external threads 119. Since sealing nut 126 and clamp nut 162 are tightened by longitudinal movement in opposite directions from one another, it will be apparent that such tightening can be easily accomplished simultaneously.

As also shown in FIG. 5 the connector of this embodiment also comprises a flexible seal member 175 mounted within inner throughbore 107. Seal member 175 helps to facilitate a substantially liquid-tight seal about an inserted conduit, as shown by FIG. 5. Seal member 175 is similar in construction to seal member 75 described previously. Seal member 175 comprises a sealing end 176 attached to a support collar 177. Support collar 177 rests against shoulder 185 on the interior of body 105. Shoulder 185 acts to prevent seal member 175 from moving further within throughbore 107. As shown by FIG. 5, when a conduit is inserted into the connector of the present invention, sealing end 176, if sized properly, will seal about the circumference of the conduit.

As also shown in FIG. 5, since the inner diameter of distal end 178 of sealing end 176 is preferably slightly smaller than the diameter of the conduit being inserted there through, insertion of the conduit may be difficult. In order to aid insertion of the conduit, a rigid, conical thimble 190 is provided. Thimble 190 can be placed over the end of the conduit being inserted into the connector, thereby assisting the user in insertion of the conduit into the seal member 175. It should be noted that thimble 190 can also be utilized with the preferred embodiment that has been previously described.

As was the case with the preferred embodiment, in this second embodiment, body 105, disk-like extension 116, and grip member 150 can be singularly molded of a rigid material such a plastic. As long as the thickness of flexing ends 153 of gripping fingers 151 are sized properly, the gripping in fingers will still be capable of collapsing about the conduit without risk of breakage. Circular seal 115 is preferably of an elastomeric material, and is secured to extension 116 by gluing or the like. Seal member 175 is likewise of an elastomeric material such as rubber.

Having shown and described the preferred embodiments of the present invention, further adaptations of the connector described herein can be accomplished by appropriate modifications by one of ordinary skill in the art without departing from the scope of the present invention. Several of such potential modifications have been mentioned, and others will be apparent to those skilled in the art. For example, circular seal 115 and its associated disk-like extension 116 could be utilized in the first embodiment in place of O-ring 15 and recess 17 on sealing nut 16. In addition, in the preferred embodiment, cam surface 160 could alternatively be provided on compression member 63 while at the same time reversing the orientation of grip member 50, so that the cam surface carried by the compression member will be forced against the gripping fingers to thereby collapse the fingers about the conduit. Accordingly, the scope of the present invention should be considered in terms of the following claims and is understood not be limited to the details of structure and operations shown and described in the specification and drawings.

What I claim is:

1. A liquid-tight, strain-relief connector for conduit, said body comprising:

(a) a substantially hollow body having a longitudinal axis and front and rear portions spaced therealong;

(b) means for attaching the front portion of the body to a bulkhead;

(c) a cam surface;

(d) an at least partially hollow grip member having a plurality of collapsible gripping fingers;

(e) a seal member having a collapsible sealing end, said sealing end telescopically received at least partially within said grip member within said hollow body; and (f) a clamp nut longitudinally telescoping over said rear portion of said hollow body for adjustable attachment therewith along said longitudinal axis, said clamp nut comprising a compression member which extends longitudinally at least partially into said hollow body, whereby longitudinal adjustment of said clamp nut toward said front portion helps to urge said gripping fingers against said cam surface, thereby collapsing said gripping fingers and said sealing end of said seal member radially inwardly about a connected conduit.

2. The connector of claim 1, wherein said grip member further comprises a base, and wherein said gripping fingers are longitudinally cantilevered from said base, said base sized to slideably fit within said hollow body with said gripping fingers oriented along said longitudinal axis of said body.

3. The connector of claim 2, wherein said cam surface is formed within said hollow body intermediate said front and rear portions.

4. The connector of claim 1, wherein said means for attaching the connector comprises a longitudinally adjustable sealing nut disposed between said front and rear portions on said body, and an elastomeric member, whereby longitudinal movement of said sealing nut towards said front portion comprises said elastomeric member between said sealing nut and said bulkhead.

5. The connector of claim 4, wherein said means for attaching further comprises external threads on said front portion of said body.

6. The connector of claim 1, wherein said means for attaching comprises at least one resiliently compressible locking tab on said front portion of said body.

7. The connector of claim 6, wherein said means for attaching further comprises external threads on said front portion of said body.

8. The connector of claim 1, wherein said gripping fingers are relatively rigid, yet still collapsible, and wherein said seal member is made of a flexible material.

9. The connector of claim 1, wherein said grip member comprises a ring-like base, and wherein said seal member further comprises a support collar affixed to said sealing end, said support collar having an outer diameter greater than the inner diameter of said ring-like base of said grip member, thereby preventing said support collar from extending into said grip member.

10. The connector of claim 9, wherein the inner circumference of said ring-like base of said grip member comprises a plurality of flat edges.

11. A liquid-tight, strain-relief connector for conduit, said connector comprising:

(a) a substantially hollow body having a longitudinal axis, and front and rear portions spaced therealong;

(b) a longitudinally adjustable sealing nut disposed between said front and rear portions, said sealing nut having internal threads corresponding to external threads on said body intermediate said front and rear portions, wherein longitudinal movement of said sealing nut is accomplished by rotation of said sealing nut relative to said front portion, and wherein said sealing nut further comprises an annular access oriented towards said front portion;

(c) at least one resiliently compressible locking tab on said front portion of said body;

(d) an elastomeric seal disposed adjacent at least partially said sealing nut whereby said seal is compressed between said recess, said bulkhead, and said body upon longitudinal movement of said sealing nut towards said front portion;

(c) a cam surface located within the hollow body intermediate said front and rear portions;

(d) a grip member having a ring-like base and a plurality of flexible gripping fingers cantilevered from said base, said base sized to slideably fit within said hollow body with said cantilevered fingers oriented along said longitudinal axis;

(e) a seal member having a collapsible, flexible sealing end, said sealing end telescopically received within said grip member within said hollow body; and (f) a clamp nut which longitudinally telescopes over said rear portion of said hollow body by means of internal threads on said clamping nut corresponding to external threads on said rear portion of said body, said clamp nut further comprising a compression member which extends longitudinally into said hollow body, whereby longitudinal movement of said clamp nut by rotation of said clamp nut relative to said rear portion urges said gripping fingers against said cam surface, thereby collapsing said gripping fingers and said sealing end of said seal member radially inwardly.

12. A strain-relief, liquid tight connector for conduit said connector comprising:

(a) a body having front and rear portions, a cam surface, and a substantially hollow inner throughbore formed along a longitudinal axis thereof;

(b) means for attaching the front portion of the connector body to a bulkhead;

(c) a flexible seal member for receiving a conduit, said seal member facilitating a substantially liquid tight seal about the conduit during use;

(d) an at least partially hollow grip for selectively gripping the conduit, said seal member being located at least partially within said grip in use; and (e) a clamp nut telescoped over said rear portion of said body for selective longitudinal adjustment therealong, wherein said longitudinal adjustment of said clamp nut causes said cam surface to contact said grip to provide inward radial compression thereof.

13. The connector of claim 12, wherein said grip comprises a plurality of substantially rigid yet collapsible gripping fingers, and wherein said longitudinal adjustment of said clamp nut effectuates contact between said cam surface and said gripping fingers, thereby providing inward radial compression of said gripping fingers to grip the connected conduit.

14. The connector of claim 13, wherein said seal member is located at least partially within said hollow inner throughbore in use.

15. A strain-relief, liquid tight connector for conduit, said connector comprising:

(a) a body having front and rear portions, and a substantially hollow inner throughbore formed along a longitudinal axis thereof;

(b) means for attaching the front portion of the connector body to a bulkhead;

(c) a flexible seal member mounted at least partially within said hollow inner throughbore for receiving a conduit to be connected, said seal member facilitating a substantially liquid tight seal about the conduit during use;

(d) an at least partially hollow grip comprising a plurality of substantially rigid yet collapsible gripping fingers which are cantilevered from said rear portions of said body, and wherein each of said gripping fingers has a shoulder surface located thereon; and (e) a clamp nut having a cam surface and being telescoped over said rear portion of said body for selective longitudinal adjustment therealong, whereby longitudinal adjustment of said clamp nut urges said cam surface against said shoulder surfaces, thereby radially compressing said gripping fingers.

16. A strain-relief, liquid tight connector for conduit, said connector comprising: connector comprising:

(a) a body having front and rear portions, and a substantially hollow inner throughbore formed along a longitudinal axis thereof;

(b) a longitudinally adjustable sealing nut disposed between said front and rear portions of said body;

(c) an elastomeric member, whereby longitudinal adjustment of said sealing nut towards said front portions compresses said elastomeric member between said sealing nut and a bulkhead in use;

(d) a flexible seal member mounted for receiving a conduit to be connected, said seal member facilitating a substantially liquid tight seal about the conduit during use;

(e) an at least partially hollow grip for selectively gripping the conduit and (f) a clamp nut telescoped over said rear portion of said body for selective longitudinal adjustment therealong, wherein said longitudinal adjustment of said clamp nut provides inward radial compression of said grip.

17. A strain-relief, liquid tight connector for conduit, said connector comprising:

(a) a body having front and rear portions, and a substantially hollow inner throughbore formed along a longitudinal axis thereof;

(b) a cam surface positioned at least partially within said inner throughbore;

(c) means for attaching the front portion of the connector body to a bulkhead;

(d) a flexible seal member mounted at least partially within said hollow inner throughbore in use for receiving a conduit to be connected, said seal member facilitating a substantially liquid tight seal about the conduit during use;

(e) an at lest partially hollow grip comprising a plurality of substantially rigid yet collapsible gripping fingers; and (f) a clamp nut telescoped over said rear portion of said body for selective longitudinal adjustment therealong, said seal member located at least partially within said grip, and wherein longitudinal adjustment of said clamp nut effectuates contact between said cam surface and said gripping fingers, thereby providing inward radial compression of said gripping fingers to grip the conduit.

18. The connector of claim 17, wherein said grip comprises a ring-like base to which said gripping fingers are attached.

19. The connector of claim 18, wherein said grip is a unitary structure, and said gripping fingers are cantilevered from said base.

20. The connector of claim 18, wherein said seal member further comprises a collapsible sealing end and a collar, and said collar interacts with said ring-like base to limit the extent to which said sealing end is inserted into said grip.

* * * * *